(12) United States Patent
Boldt

(10) Patent No.: US 7,421,071 B2
(45) Date of Patent: *Sep. 2, 2008

(54) CALL PROGRESS TONE GENERATION IN A COMMUNICATION SYSTEM

(75) Inventor: Dean C. Boldt, Parkville, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/677,869

(22) Filed: Feb. 22, 2007

(65) Prior Publication Data

US 2007/0135107 A1    Jun. 14, 2007

Related U.S. Application Data

(63) Continuation of application No. 11/343,722, filed on Jan. 31, 2006, now Pat. No. 7,203,304, which is a continuation of application No. 10/103,576, filed on Mar. 21, 2002, now Pat. No. 7,050,564.

(51) Int. Cl.
H04M 3/00 (2006.01)
H04M 1/00 (2006.01)

(52) U.S. Cl. ............. 379/257; 379/165; 379/353
(58) Field of Classification Search ................ 379/165, 379/201.01, 221.08, 257, 350, 353; 455/414.1, 455/567
See application file for complete search history.

(56) References Cited

U.S. PATENT DOCUMENTS

| 6,018,654 A * | 1/2000 | Valentine et al. ........ 455/414.4 |
| 7,050,564 B1 * | 5/2006 | Boldt ........................ 379/257 |
| 7,203,304 B2 * | 4/2007 | Boldt ........................ 379/257 |

* cited by examiner

*Primary Examiner*—Harry S Hong

(57) ABSTRACT

A method of operating a wireless calling device comprises connecting to a call tone provider configured to provide call tones, transferring a plurality of call tone requests to the call tone provider, receiving a plurality of call tones from the call tone provider in response to the plurality of call tone requests, transferring a call setup message to a telecommunication switch to initiate a call, receiving a call message from the telecommunication switch in response to the call setup message wherein the call setup message indicates a status of the call, processing the call message to select a one call tone from the plurality of call tones based on the status of the call, and audibly playing the one call tone.

10 Claims, 12 Drawing Sheets

CALL PROGRESS TONE GENERATION IN A COMMUNICATION SYSTEM

RELATED APPLICATIONS

This application is a continuation of U.S. patent application Ser. No. 11/343,722, that was filed on Jan. 31, 2006; that is titled "CALL PROGRESS TONE GENERATION IN A COMMUNICATION SYSTEM;" and that is hereby incorporated by reference into this patent application; and which is a continuation of U.S. patent application Ser. No. 10/103,576 filed Mar. 21, 2002; that is titled "CALL PROGRESS TONE GENERATION IN A COMMUNICATION SYSTEM"; and that is hereby incorporated by reference into this patent application.

FEDERALLY SPONSORED RESEARCH OR DEVELOPMENT

Not applicable.

MICROFICHE APPENDIX

Not applicable.

BACKGROUND OF THE INVENTION

1. Field of the Invention

This invention relates to the field of communication systems, and more particularly, to calling devices that generate and play call progress tones.

2. Description of the Prior Art

When making a call, a caller may hear tones or message being played that indicate the status of a call. The tones are commonly referred to as call progress tones (CPT), which are audible tones or messages played to indicate the progress of a call. One example of a call progress tone is a slow busy signal that indicates that the called party is not available. Another example of a call progress tone is a fast busy signal that indicates that the system is busy. Another example of a call progress tone is a message stating that the line is busy.

A typical communication system is comprised of a calling device coupled to an originating system. The originating system is coupled to a Public Switched Telephone Network (PSTN). Examples of calling devices are telephones, cellular phones, computers, and fax machines. An example of the originating system is a class-5 switch.

A user of the calling device initiates a call to a called device in the PSTN through the originating system. The calling device transmits set up messages to the originating system. The originating system sets up the call by exchanging signaling with a terminating system connected to the called device. The terminating system transmits acknowledgment messages to the originating system to indicate the progress of the call. The acknowledgment messages inform the originating system whether the call can be completed. For instance, the acknowledgment messages indicate that the PSTN is busy, that the called device is busy, that the called device is being alerted, or some other event. The originating system processes the acknowledgment messages to determine the proper call progress tone for the call. The originating system generates and transmits the call progress tone to the calling device. The calling device plays audible sounds that represent the call progress tone so that the user of the calling device can hear it.

Unfortunately, the originating system generates the call progress tones and maintains the call to transmit the call progress tones, which increases the workload on the originating system. Consequently, the originating system does not effectively handle other calls, which could adversely affect the performance of the communication system.

This can be a particular problem in wireless networks. The originating system transmits the call progress tones over a frequency to a wireless phone. Frequencies and bandwidth are valuable commodities in a wireless network, and the originating system uses valuable bandwidth to transmit the call progress tones.

SUMMARY OF THE INVENTION

In an embodiment of the invention, a method of operating a wireless calling device comprises connecting to a call tone provider configured to provide call tones, transferring a plurality of call tone requests to the call tone provider, receiving a plurality of call tones from the call tone provider in response to the plurality of call tone requests, transferring a call setup message to a telecommunication switch to initiate a call, receiving a call message from the telecommunication switch in response to the call setup message wherein the call setup message indicates a status of the call, processing the call message to select a one call tone from the plurality of call tones based on the status of the call, and audibly playing the one call tone.

BRIEF DESCRIPTION OF THE DRAWINGS

The appended claims set forth the features of the present invention with particularity. The invention, together with its advantages, may be best understood from the following detailed description taken in conjunction with the accompanying drawings:

DETAILED DESCRIPTION OF THE INVENTION

Figure 1:
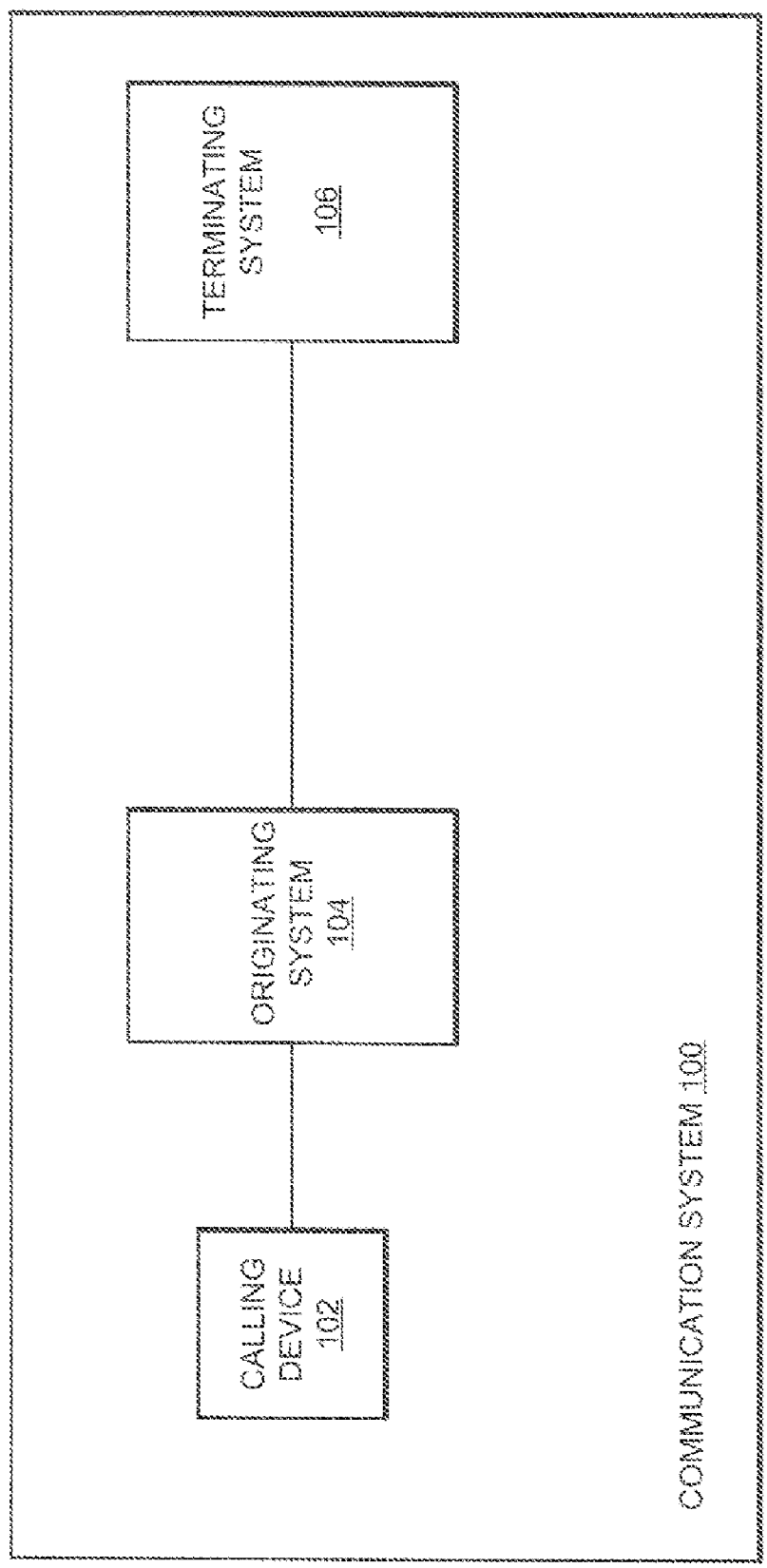
FIG. 1 is a block diagram that depicts a communication system in the prior art.
Figure 2:
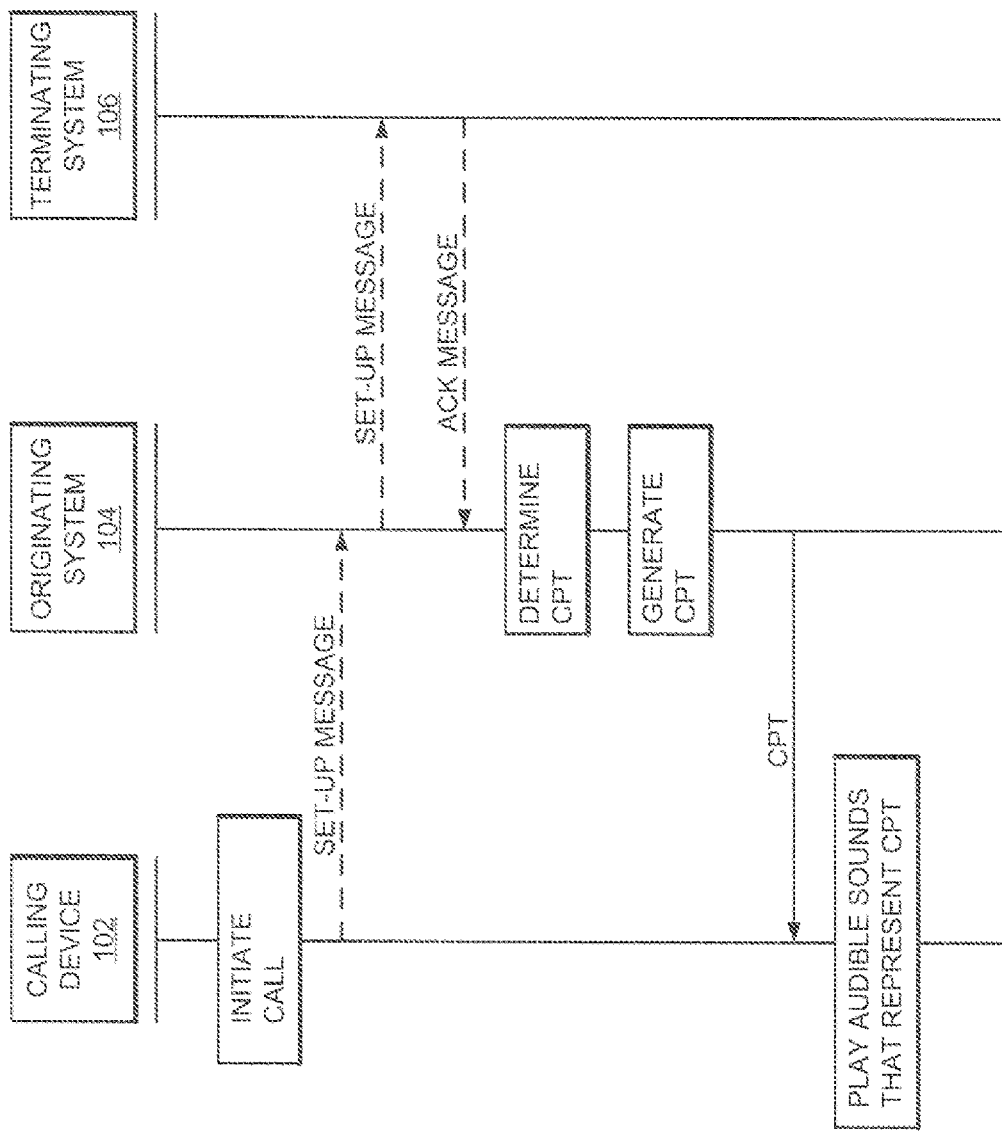
FIG. 2 is a signal diagram for the communication system in FIG. 1 in the prior art.

Prior Art Communication System—FIGS. 1-2

FIG. 1 illustrates communication system 100 in the prior art. Communication system 100 comprises a calling device 102, an originating system 104, and a terminating system 106. Calling device 102 is any device configured to play audible sounds that represent call progress tones (CPT). Originating system 104 is any system configured to set up and maintain a call.

FIG. 2 illustrates a signal diagram for communication system 100. Calling device 102 initiates a call to terminating system 106 through originating system 104. Calling device 102 transmits a first set up message to originating system 104. Originating system 104 processes the first set up message and generates a second set up message. Originating system 104 transmits the second set up message to terminating system 106. Originating system 104 receives an acknowledgment (ACK) message from terminating system 106. The acknowledgment message indicates the progress of the call. Originating system 104 processes the acknowledgment message to determine a call progress tone. Call progress tones are tones or messages that indicate the progress of the call. Originating system 104 generates the call progress tone and transmits the call progress tone to calling device 102. Calling device 102 plays audible sounds that represent the call progress tone. The user of calling device 102 can determine the progress of the call by listening to the call progress tone played by calling device 102. Originating system 104 releases the call if calling device 102 hangs up.

Figure 3:
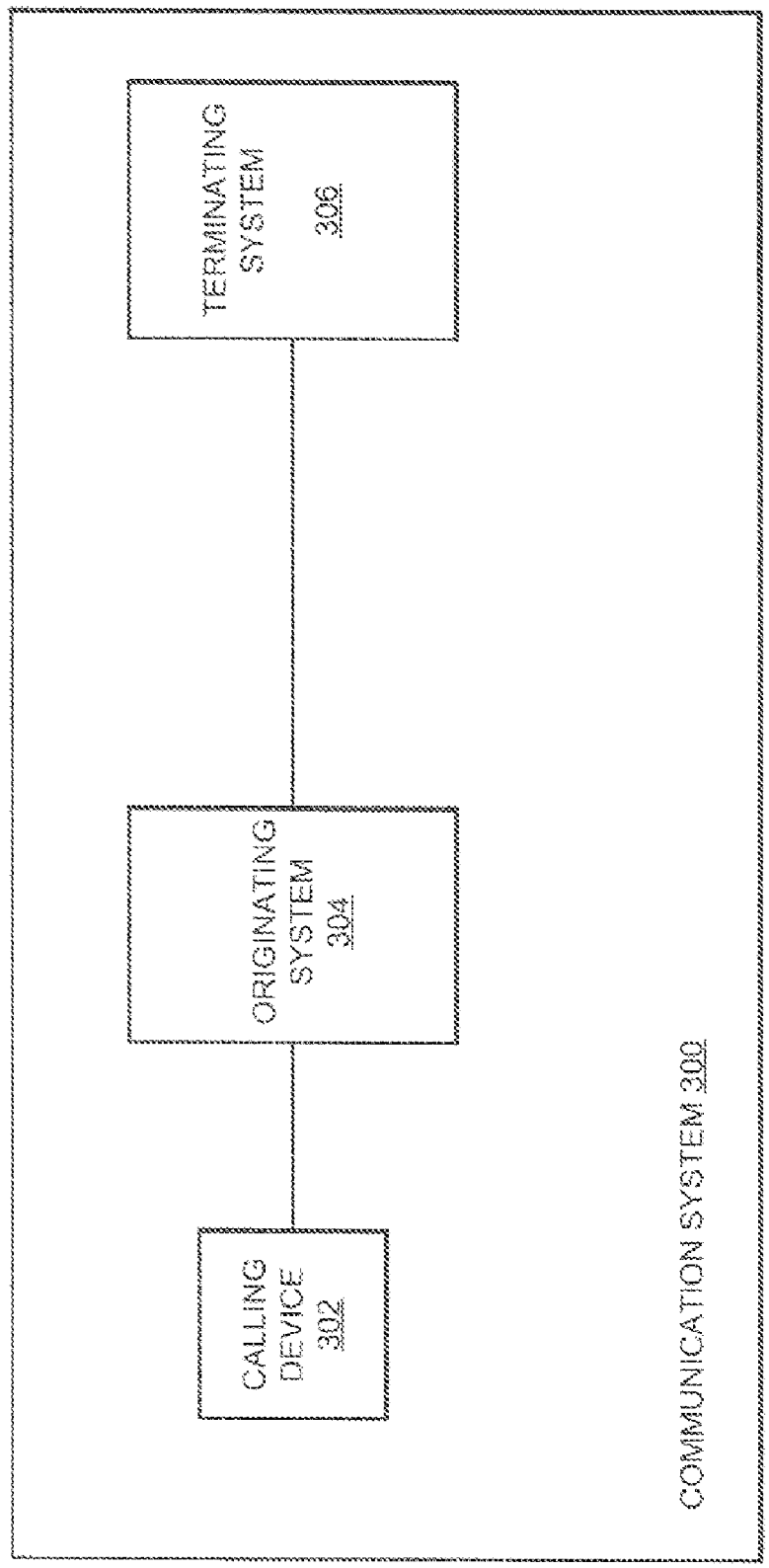
FIG. 3 is a block diagram that depicts a communication system in an example of the invention.
Figure 4:
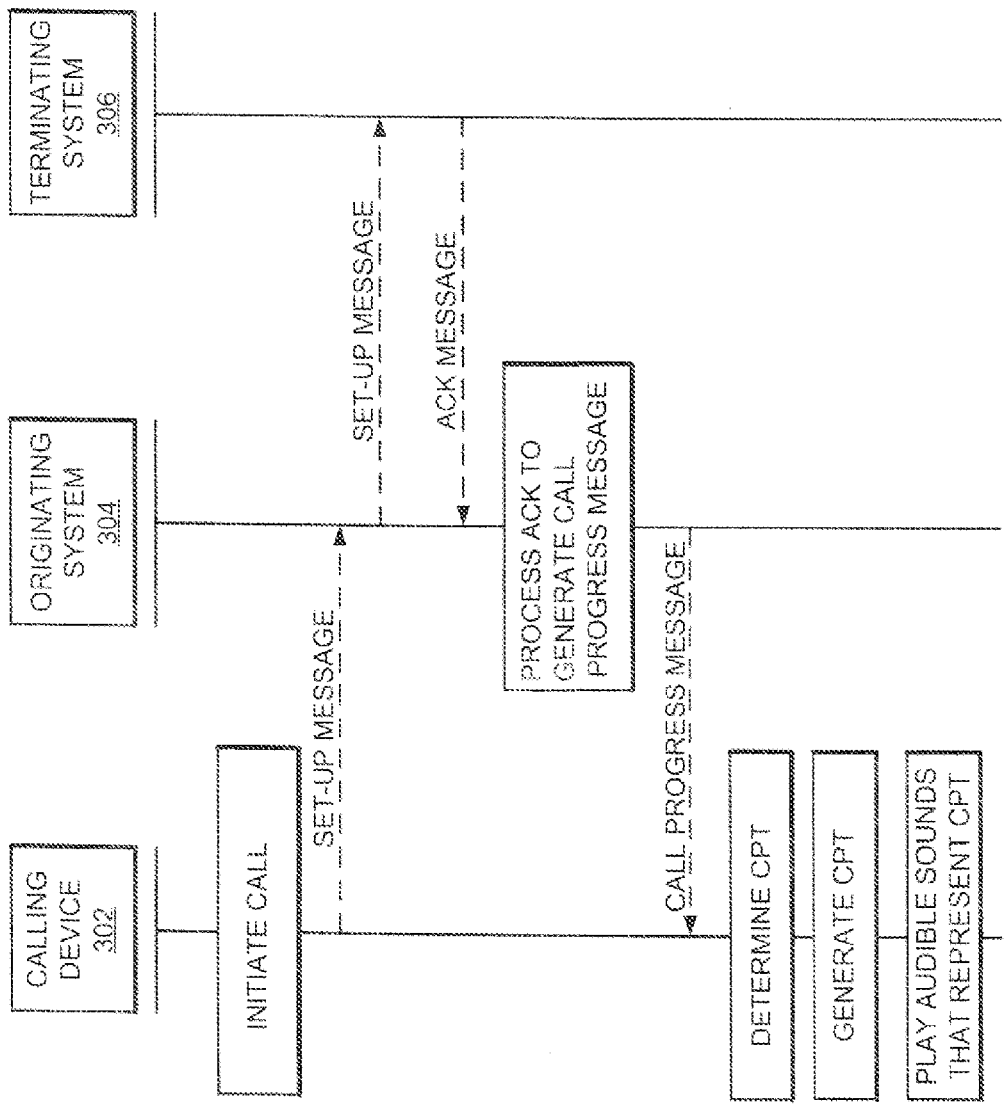
FIG. 4 is a signal diagram for the communication system in FIG. 3 in an example of the invention.

First Embodiment of a Communication System—FIGS. 3-4

FIGS. 3-4 depict a specific example of a communication system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 3-4 have been simplified or omitted for clarity.

FIG. 3 depicts communication system 300 in an example of the invention. Communication system 300 is comprised of calling device 302, originating system 304, and terminating system 306. Calling device 302 is configured to communicate with originating system 304. Originating system 304 is configured to communicate with terminating system 306.

A call typically includes signaling and user communications. Calling device 102 is any device capable playing audible sounds that represent call progress tones (CPT). Call progress tones are tones or messages that indicate the progress of a call. Originating system 304 is any system capable of setting up and maintaining a call. Terminating system 306 is any system capable of communicating with originating system 304 for a call.

FIG. 4 illustrates a signal diagram for communication system 300 in an example of the invention. Calling device 302 initiates a call with terminating system 306 through originating system 304. Calling device 302 transmits a first set up message to originating system 304. Originating system 304 processes the first set up message and generates a second set up message. Those skilled in the art will appreciate that some conventional steps for setting up and placing a call will not be discussed for the sake of brevity. Originating system 304 transmits the second set up message to terminating system 306.

Originating system 304 then receives an acknowledgment (ACK) message from terminating system 306. Originating system 304 processes the acknowledgment message to generate a call progress message. A call progress message is any tone, signal, message that indicates the status of a call. Originating system 304 transmits the call progress message to calling device 302.

Calling device 302 receives the call progress message. Calling device 302 processes the call progress message to determine a call progress tone. Calling device 302 generates the call progress tone and plays audible sounds that represent the call progress tone.

In this example, calling device 302 advantageously generates the call progress tone instead of originating system 304. Originating system 304 is then able to release the call after transmitting the call progress message to calling system 302. Originating system 304 can then handle other calls.

Second Embodiment of a Communication System—FIGS. 5-13

FIGS. 5-13 depict specific examples of a communication system in accord with the present invention. Those skilled in the art will appreciate numerous variations from these examples that do not depart from the scope of the invention. Those skilled in the art will also appreciate that various features described below could be combined with other embodiments to form multiple variations of the invention. Those skilled in the art will appreciate that some conventional aspects of FIGS. 5-13 have been simplified or omitted for clarity.

Figure 5:
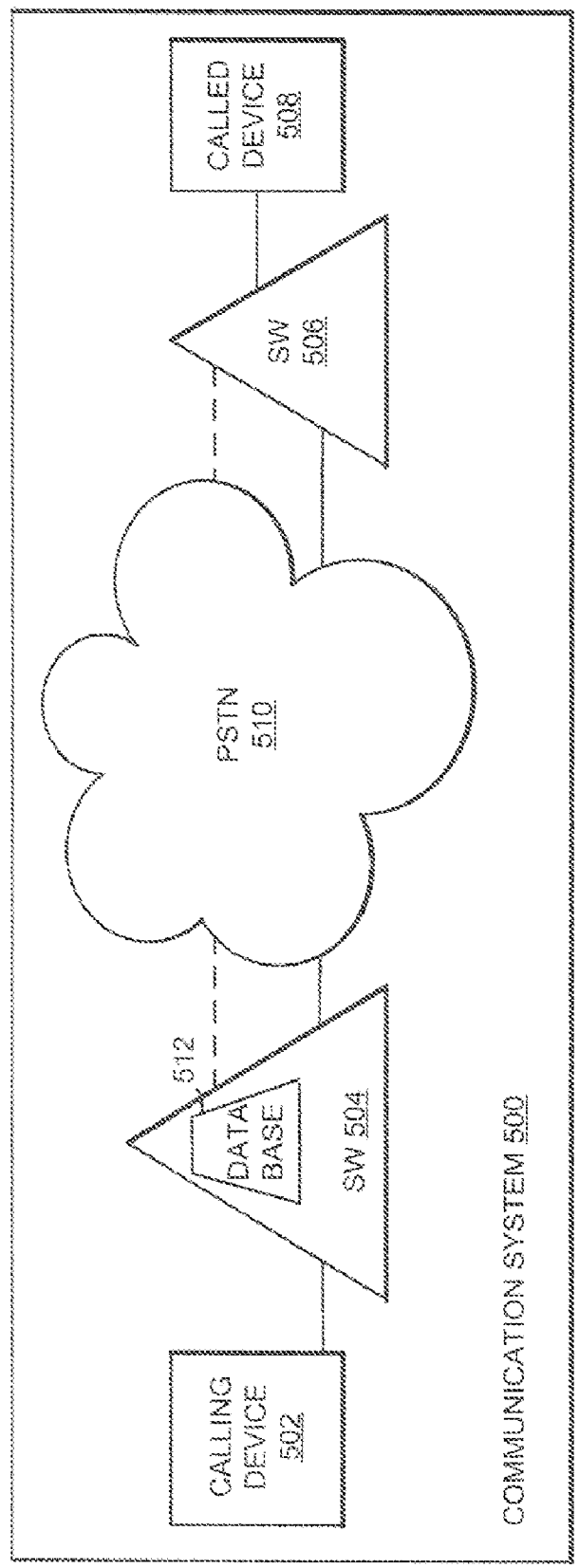
FIG. 5 is a block diagram that depicts a communication system wherein a calling device has a wireline connection with a switch in an example of the invention.

FIG. 5 depicts an example of communication system 500. Communication system 500 is comprised of calling device 502, switch 504, switch 506, called device 508, and Public Switched Telephone Network (PSTN) 510. Switch 504 includes database 512.

Calling device 502 is configured to communicate with switch 504. In this example, calling device 502 communicates with switch 504 over a wireline link. Switch 504 is configured to communicate with PSTN 510. Those skilled in the art will appreciate that switch 504 communicates with PSTN 510 over a signaling link and a bearer link. PSTN 510 is configured to communicate with switch 506. Those skilled in the art will appreciate that switch 506 communicates with PSTN 510 over a signaling link and a bearer link. Switch 506 is configured to communicate with called device 508. Examples of calling device 502 include, but are not limited to, telephones, computers, and fax machines. Switches 504, 506 comprise conventional switches such as class-5 switches produced by Lucent Technologies.

Figure 6:
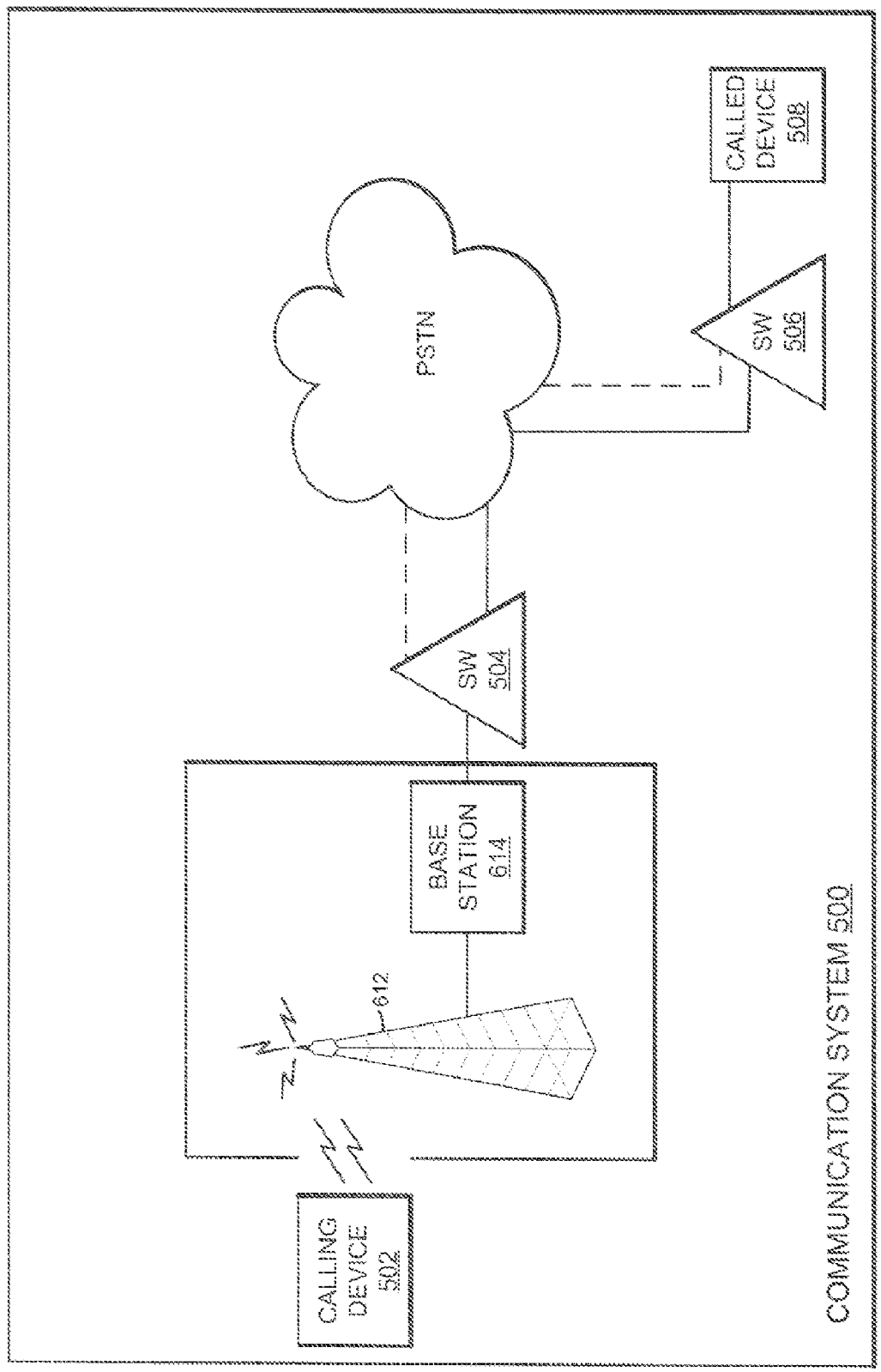
FIG. 6 is a block diagram that depicts a communication system wherein a calling device has with a wireless connection with a switch in an example of the invention.

FIG. 6 depicts another example of communication system 500. In this example, calling device 502 communicates with switch 504 over a wireless link. The wireless link is facilitated by a tower 612 coupled to a base station 614. In this example, calling device 502 could be a cellular phone.

To illustrate communication between calling device 502 and switch 504, tower 612 receives wireless signals from calling device 502. The wireless signals include signaling and user communications. Tower 612 and base station 614 function together to convert the wireless signals into wireline signals. Base station 614 transfers the wireline signals to switch 504. Tower 612 and base station 614 function in a similar manner to receive wireline signals from switch 504, convert the wireline signals to wireless signals, and transfer the wireless signals to calling device 502.

Figure 7:
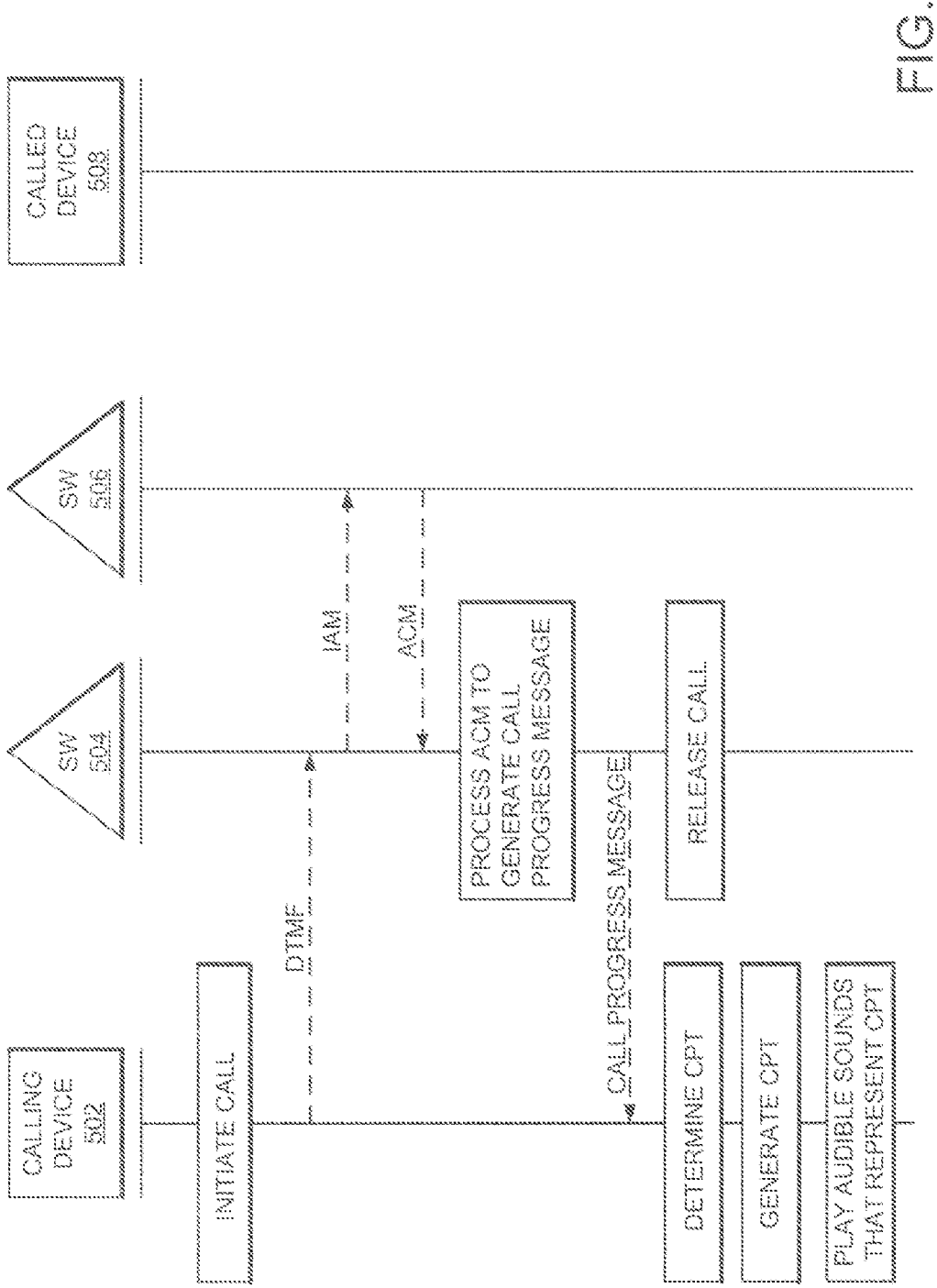
FIG. 7 is a signal diagram for the communication systems in FIGS. 5 and 6 in an example of the invention.

FIG. 7 illustrates a signal diagram of communication system 500 in an example of the invention. Calling device 502 initiates a call with called device 508 through switches 504, 506 and PSTN 510. To initiate the call, calling device 502 transmits Dual Tone Multi Frequency (DTMF) signaling to switch 504. Examples of signaling include Signaling System 7 (SS7) and C7. One skilled in the art will recognize that the following steps may involve more signaling depending on the protocol used in communication system 500. Switch 504 processes the DTMF signaling and generates an Initial Address Message (IAM). Switch 504 transmits the IAM to switch 506 over PSTN 510. Switch 506 processes the IAM and generates an Address Complete Message (ACM). Switch 506 transmits the ACM to switch 504 over PSTN 510. Those skilled in the art will appreciate that some conventional steps for setting up and placing a call will not be discussed for the sake of brevity.

Switch 504 processes the ACM to generate a call progress message. Switch 504 transmits the call progress message to calling device 502. Calling device 502 processes the call progress message to determine a call progress tone. Examples of call progress tones are dial tone, busy tone, ringback tone, error tone, and re-order. Calling device 502 then generates the call progress tone and plays audible sounds that represent the call progress tone.

Figure 8:
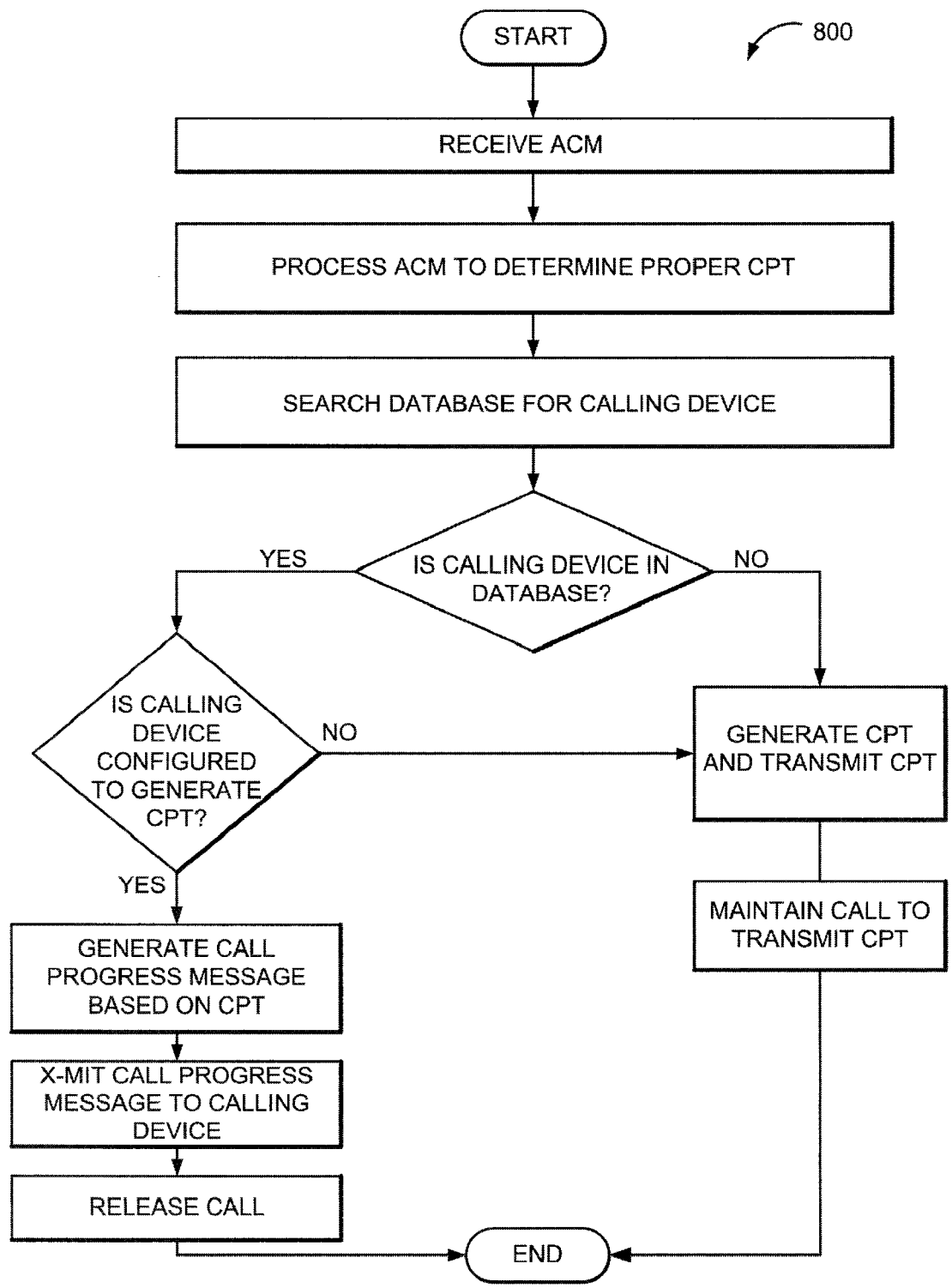
FIG. 8 is a flow diagram of a process executed by a switch to provide call progress tones in an example of the invention.

FIG. 8 depicts a process 800 executed by switch 504 to provide call progress tones for the call in an example of the invention. Switch 504 receives the ACM from switch 506. Switch 504 processes the ACM to determine a proper call progress tone. Switch 504 then determines if calling device 502 is configured to generate call progress tones. To make this determination, switch 504 searches database 512 for calling device 502. Database 512 contains a list of calling devices that are configured to generate call progress tones.

If switch 504 does not find calling device 502 in database 512, then switch 504 operates in the conventional manner described in the prior art. In the conventional manner, switch 504 generates the proper call progress tone and transmits the proper call progress tone to calling device 502. Switch 504 maintains the call to transmit the proper call progress tone. Process 800 then ends.

If switch 504 does find calling device 502 in database 512, then switch 504 determines if calling device 502 is configured to generate the proper call progress tone. Database 512 lists the call progress tones that each calling device can generate. If calling device 502 is not configured to generate the proper call progress tone, then switch 504 operates in the conventional manner described in the prior art.

If calling device 502 is configured to generate the proper call progress tone, then switch 504 generates a call progress message based on the call progress tone. Switch 504 transmits the call progress message to calling device 502. Switch 504 then releases the call. Process 800 then ends. Those skilled in the art will appreciate that calling device 502 could also release the call instead of, or in addition to, switch 504.

Figure 9:
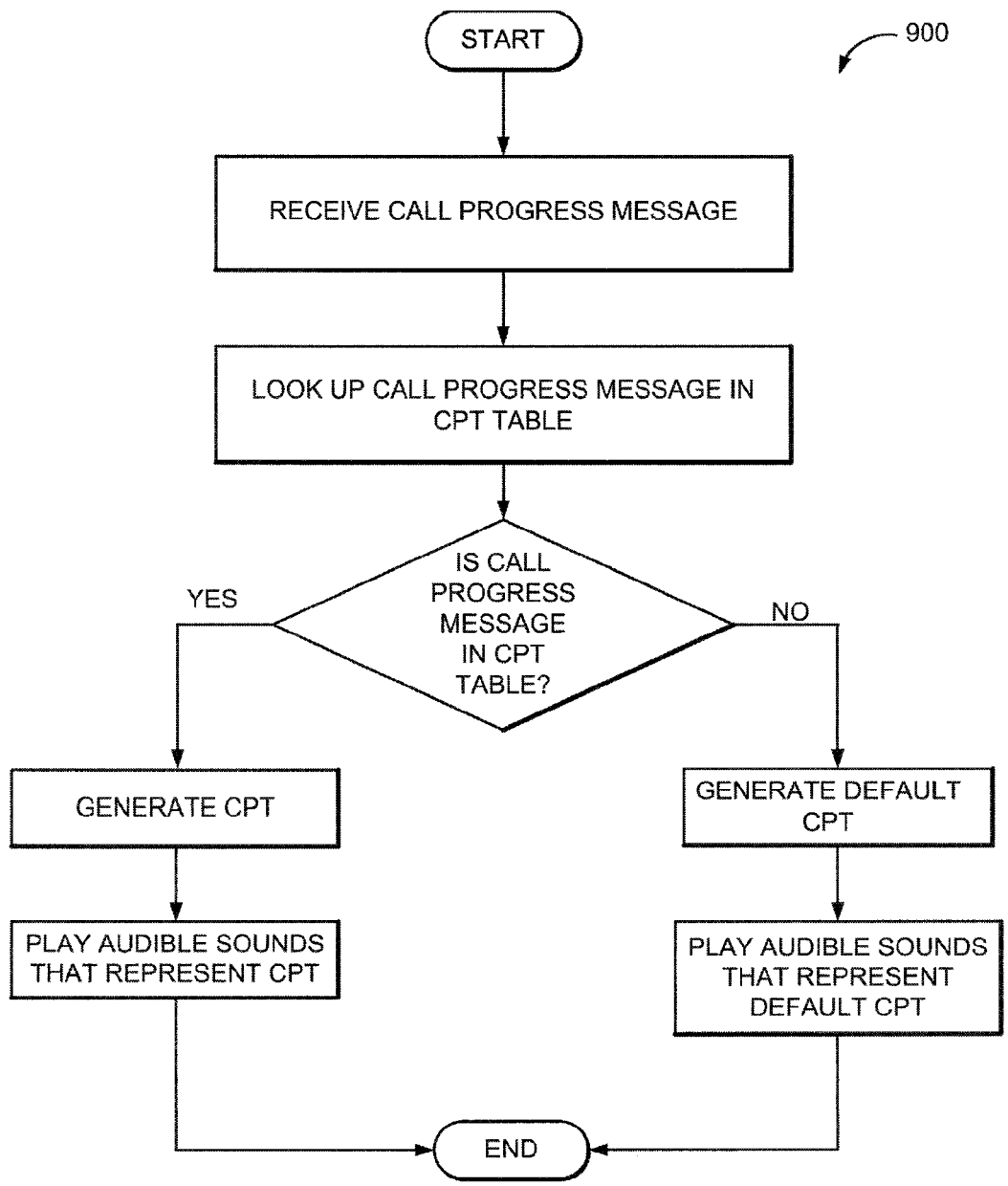
FIG. 9 is a flow diagram of a process executed by a calling device to provide call progress tones in an example of the invention.

FIG. 9 depicts a process 900 executed by calling device 502 to generate call progress tones in an example of the invention. Calling device 502 receives the call progress message from switch 504. Calling device 502 processes the call progress message and performs a table look-up in a call progress tone table based on the call progress message. If calling device 502 locates the call progress message in the call progress tone table, then calling device 502 determines the proper call progress tone based on the call progress message. Calling device 502 then generates the proper call progress tone and plays audible sounds that represent the proper call progress tone. Process 900 then ends.

If calling device 502 does not locate the call progress message in the call progress tone table, then calling device 502 determines a default call progress tone. Calling device 502 generates the default call progress tone and plays audible sounds that represent the proper call progress tone. Process 900 then ends.

Figure 10:
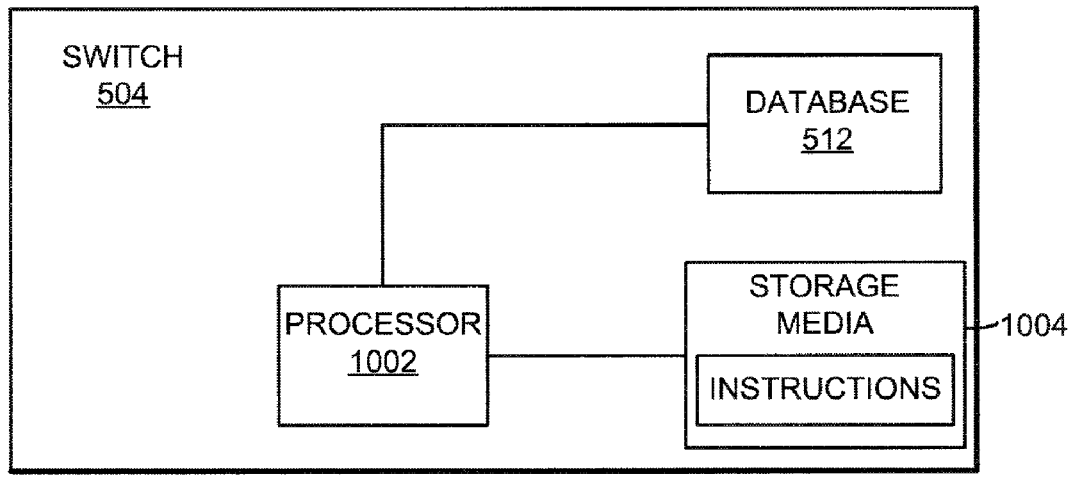
FIG. 10 is a block diagram that depicts a switch in an example of the invention.

Those skilled in the art will appreciate that the above-described switch 504 could be comprised of instructions that are stored on storage media. FIG. 10 shows an example of switch 504. Switch 504 is comprised of processor 1002 and storage media 1004. The instructions can be retrieved and executed by processor 1002. Some examples of instructions are software, program code, and firmware. Some examples of storage media 1004 are memory devices, tape, disks, integrated circuits, and servers. The instructions are operational when executed by processor 1002 to direct processor 1002 to operate in accord with the invention. The term "processor" refers to a single processing device or a group of inter-operational processing devices. Some examples of processor 1002 are computers, integrated circuits, and logic circuitry. Those skilled in the art are familiar with instructions, processors, and storage media. Switch 504 includes database 512 that could be incorporated within storage media 1004.

Figure 11:
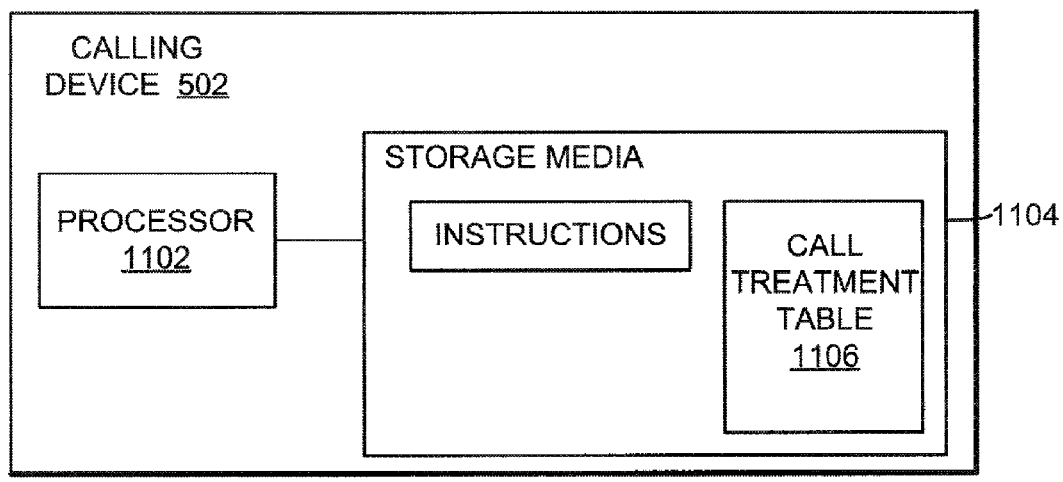
FIG. 11 is a block diagram that depicts a calling device in an example of the invention.

Those skilled in the art will also appreciate that the above-described calling device 502 could be comprised of instructions that are stored on storage media. FIG. 11 shows an example of calling device 502. Calling device 502 is comprised of processor 1102 and storage media 1104. The instructions can be retrieved and executed by processor 1102. Some examples of instructions are software, program code, and firmware. Some examples of storage media 1104 are memory devices, tape, disks, integrated circuits, and servers. The instructions are operational when executed by processor 1102 to direct processor 1102 to operate in accord with the invention. The term "processor" refers to a single processing device or a group of inter-operational processing devices. Some examples of processor 1102 are computers, integrated circuits, and logic circuitry. Those skilled in the art are familiar with instructions, processors, and storage media. Storage media 1104 could also store call treatment table 1106 for calling device 502.

The following are exemplary operations of communication system 500 shown in FIG. 5. For a first example, assume that calling device 502 attempts to place a call to called device 508, and called device 508 is busy. Switch 506 transmits an ACM, that contains a release value denoting that called device 508 was busy, to switch 504. Switch 504 transmits a call progress message to calling device 502 and then releases the call. Calling device 502 processes the call progress message to determine the proper call progress tone. The proper call progress tone in this case is a slow busy signal. Calling device 502 generates a slow busy signal and plays the audible slow busy signal.

For a second example, assume that calling device 502 attempts to place a call to called device 508, and all trunks between switch 504 and switch 506 are busy. Switch 504 determines that the trunks are busy. Switch 504 transmits a call progress message to calling device 502 and then releases the call. Calling device 502 processes the call progress message to determine the proper call progress tone. The proper call progress tone in this case is a fast busy signal. Calling device 502 generates a fast busy signal and plays the audible fast busy signal.

Figure 12:
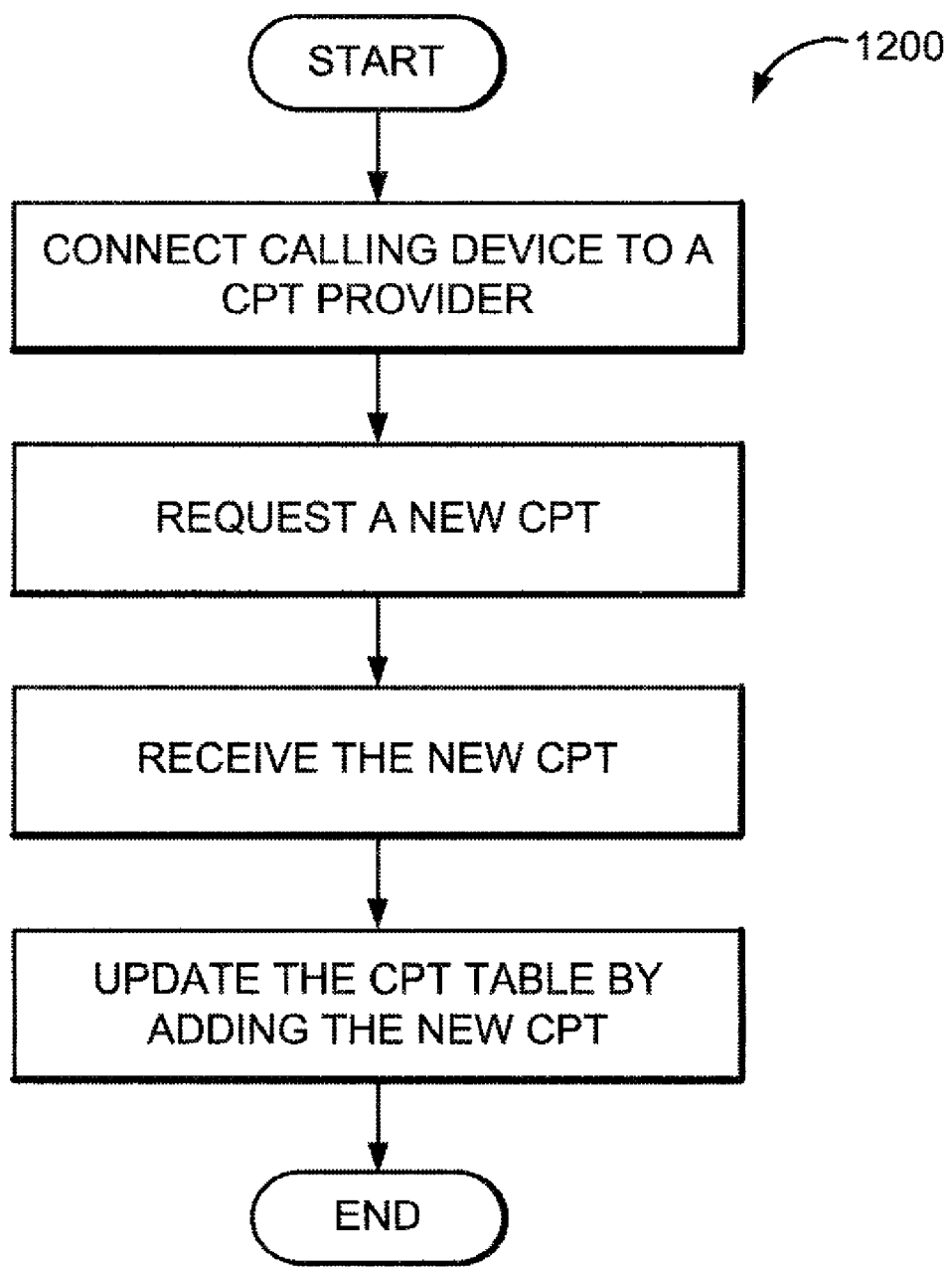
FIG. 12 is a flow diagram of a process executed by a calling device to update a call progress tone table in an example of the invention.

FIG. 12 illustrates a process 1200 for installing new call progress tones in calling device 502. Calling device 502 first connects to a provider that is configured to provide call progress tones. The connection could be, for example, to a switch, a signal processor, or a server. Calling device 502 then requests a new call progress tone. Calling device 502 receives the new call progress tone from the provider. Calling device 502 updates the call progress tone table by adding the new call progress tone to the call progress tone table. Process 1200 then ends.

Figure 13:
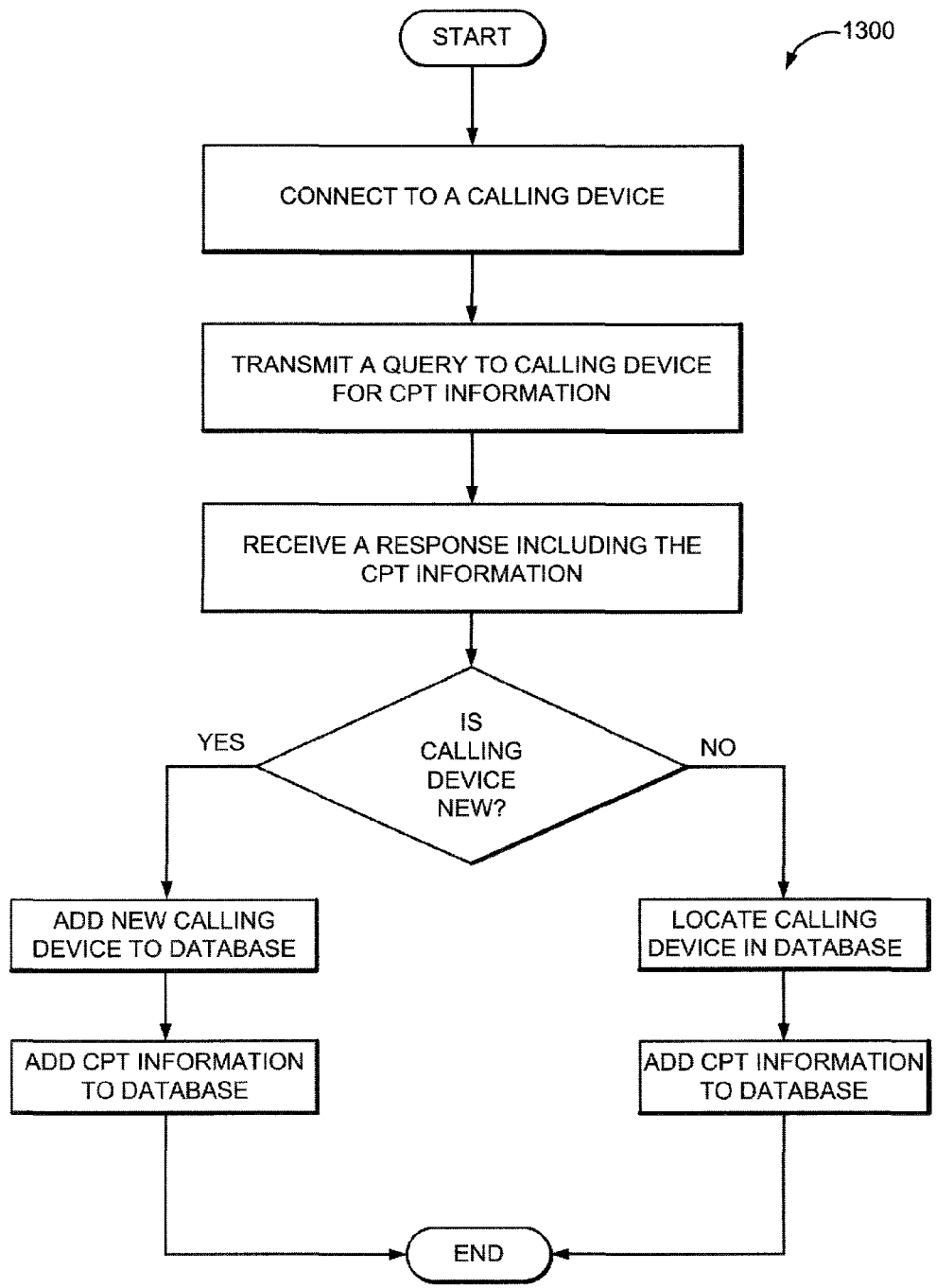
FIG. 13 is a flow diagram of a process executed by a switch to update a calling device database in an example of the invention.

FIG. 13 illustrates a process 1300 for updating database 512. Database 512 could be updated when a new calling device is added, or when a calling device installs a new call progress tone. In either case, a calling device connects to switch 504. Switch 504 transmits a query to the calling device for call progress tone information. Switch 504 receives a response from the calling device that includes the call progress tone information. If the calling device is new, then switch 504 adds the calling device and the corresponding call progress tone information to database 512. If the calling device is not new, then switch 504 locates the calling device in database 512 and updates the entry in database 512 with the call progress tone information. Process 1300 then ends.

Those skilled in the art will appreciate variations of the above-described embodiments that fall within the scope of the invention. As a result, the invention is not limited to the specific examples and illustrations discussed above, but only by the following claims and their equivalents.

The invention claimed is:

1. A method of operating a wireless calling device, the method comprising:
   connecting to a call tone provider configured to provide call tones;
   transferring a plurality of call tone requests to the call tone provider;
   receiving a plurality of call tones from the call tone provider in response to the plurality of call tone requests;
   transferring a call setup message to a telecommunication switch to initiate a call;
   receiving a call message from the telecommunication switch in response to the call setup message wherein the call message indicates a status of the call;
   processing the call message to select a one call tone from the plurality of call tones based on the status of the call; and
   audibly playing the one call tone.

2. The method of claim 1 wherein the wireless calling device comprises a wireless telephone.

3. The method of claim 1 wherein the wireless calling device comprises a computer.

4. The method of claim 1 wherein the call tone comprises a ringback tone.

5. The method of claim 1 wherein the call tone comprises a busy tone.

6. A wireless calling device comprising:
   an interface configured to connect to a call tone provider configured to provide call tones, transfer a plurality of call tone requests to the call tone provider, receive a plurality of call tones from the call tone provider in response to the plurality of call tone requests, transfer a call setup message to a telecommunication switch to initiate a call, and receive a call message from the telecommunication switch in response to the call setup message wherein the call message indicates a status of the call; and
   a processing system coupled to the interface and configured to generate the plurality of call tone requests, generate the call setup message, process the call message to select a one call tone from the plurality of call tones based on the status of the call, and audibly play the one call tone.

7. The wireless calling device of claim 6 wherein the wireless calling device comprises a wireless telephone.

8. The wireless calling device of claim 6 wherein the wireless calling device comprises a computer.

9. The wireless calling device of claim 6 wherein the call tone comprises a ringback tone.

10. The wireless calling device of claim 6 wherein the call tone comprises a busy tone.

* * * * *